Aug. 9, 1938.                J. R. BURCH                2,125,989
                         CULINARY STRUCTURE
                         Filed July 25, 1936            2 Sheets-Sheet 1
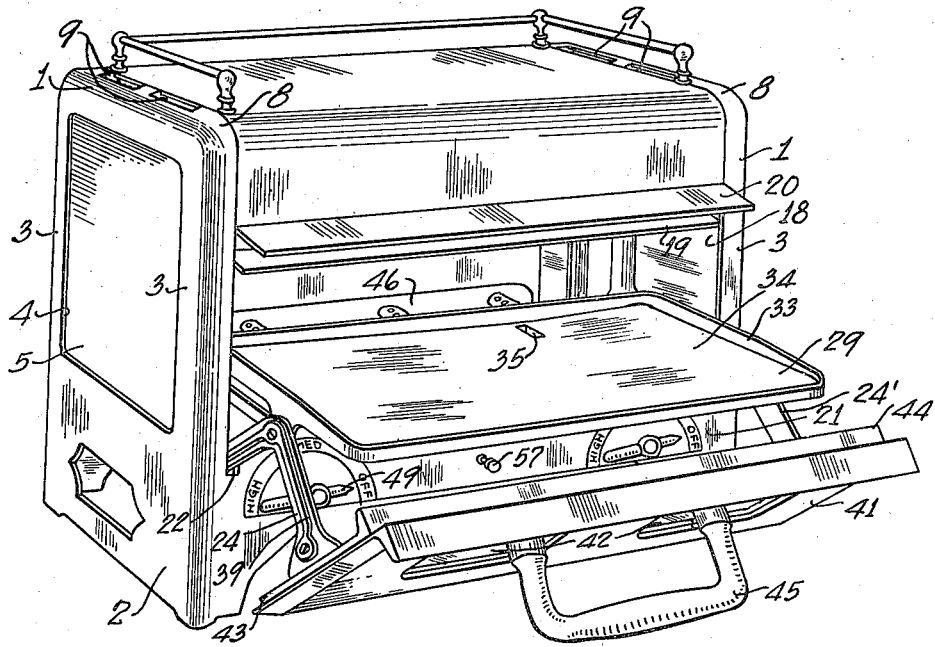
Fig·1·
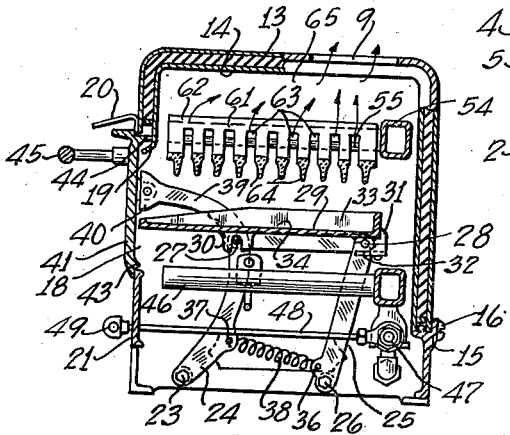
Fig·3·
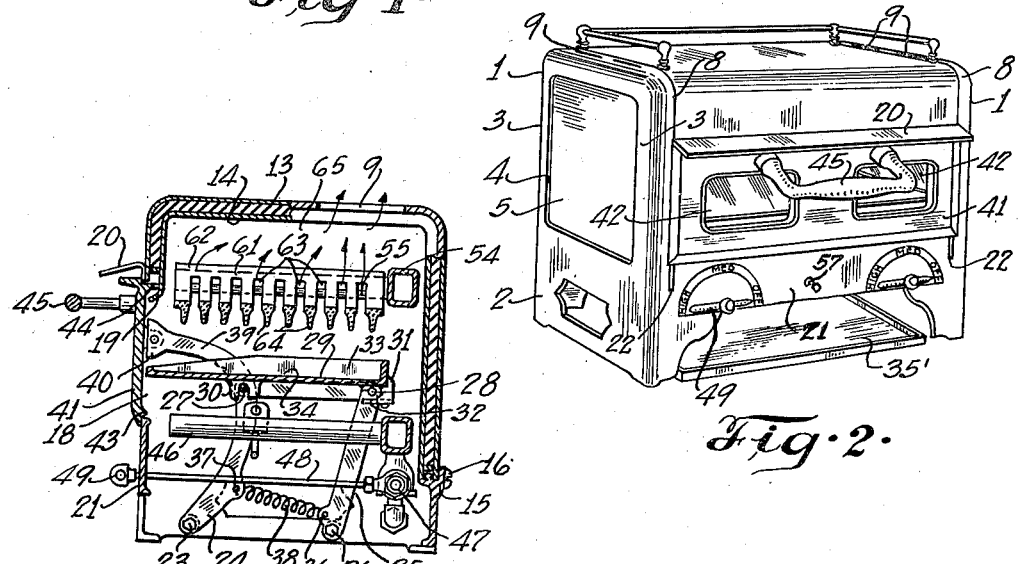
Fig·2·
INVENTOR
Julian R. Burch.
By
   ATTORNEY Aug. 9, 1938.　　　　J. R. BURCH　　　　2,125,989
CULINARY STRUCTURE
Filed July 25, 1936　　　2 Sheets-Sheet 2

INVENTOR
Julian R. Burch.
BY
ATTORNEY

Patented Aug 9, 1938

2,125,989

UNITED STATES PATENT OFFICE 2,125,989

CULINARY STRUCTURE

Julian R. Burch, St. Louis, Mo.

Application July 25, 1936, Serial No. 92,530

5 Claims. (Cl. 126—340)

This invention relates generally to culinary structures and, more particularly, to culinary structures of the type adapted for food broiling and grilling operations.

My invention has for its prime object the provision of a simple, compact structure of the type stated, wherein various types of cooking operations, such as broiling and frying, may be performed quickly, conveniently, economically, and wherein the gaseous products of cooking, such as smoke, soot, volatilized grease, fumes, and the like, will be substantially completely consumed within the structure prior to allowance of escape of the exhaust draft to atmosphere.

My invention has for another object the provision of a cooking and boiling structure in which the particular food may be simultaneously cooked on both sides and brought quickly and uniformly to a desired condition of edibility.

My invention has for still another object the provision of a structure of the kind described in which the cooking or broiling surface is uniquely mounted and balanced for operation with the opening of the door thereof, whereby the cooking or broiling surface may be substantially lowered and withdrawn from the heated area and brought to a convenient position from manipulating the food thereon.

My invention has for a further object the provision, in a structure of the kind described, of novel and unique radiant surfaces for obtaining an unusually uniform and readily controllable broiling medium above the food being cooked.

My invention has for an additional object the provision, in a structure of the kind described, of a door-member so automatically controlled and self-sealing as to prevent the escape to atmosphere of undesirable, noxious, or gaseous products of cooking.

And with the above and other objects, my invention resides in the novel features of form, construction, arrangement, and combination of parts presently described and pointed out in the claims.

In the accompanying drawings (two sheets),—

Figure 1 is a perspective view of a broiling and cooking structure constructed according to and embodying my invention, the door and cooking-plate thereof being shown in opened and outwardly projected position;

Figure 2 is a perspective view of the structure, showing the door in closed position;

Figure 3 is a side elevational cross-sectional view of the structure;

Figure 4:
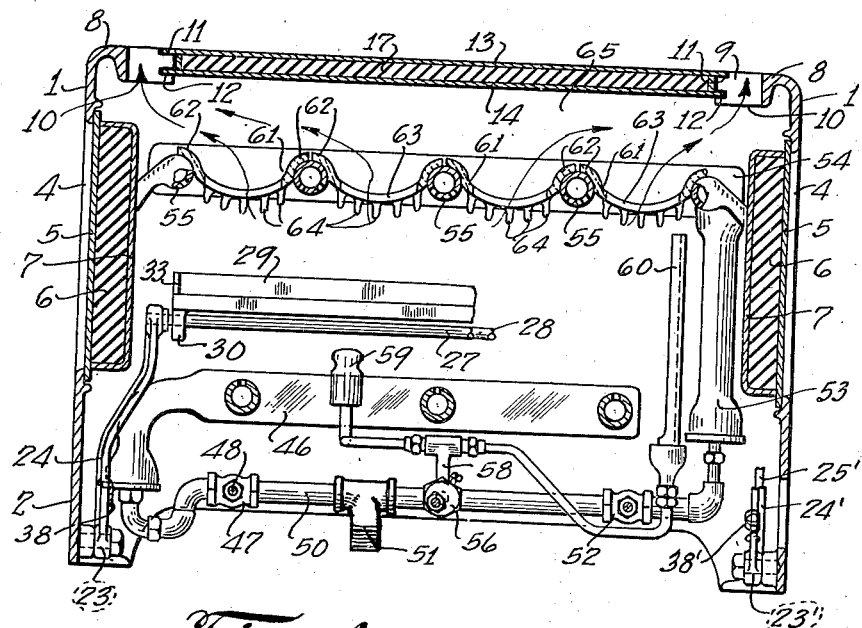
Figure 4 is a front elevational cross-sectional view of the structure.

Referring now more in detail and by reference characters to the drawings, which illustrate a preferred embodiment of my invention, the cooking and broiling structure comprises a preferably cast-iron body or casing 1, which includes a rectangular base portion 2, integral with, and upwardly extending from which, are two rectangular side frames 3 so positioned as to form a framework for the opposite ends of the structure, the frames 3 each having interior rectangular openings 4 in which are disposed preferably sheet metal end-plates 5.

Applied to the inner surface of each end-plate 5, is a pad or block of heat-insulating material 6, as best seen in Figure 4, retained in position by a sheet metal box-like structure 7, which fits over the insulating pad or block 6 and is welded or otherwise rigidly secured to the end-plates 5.

The rectangular end members 3 are each preferably L-shaped in cross-section, so as to provide a continuous flange 8 extending laterally into the plane of the front, top, and back of the structure, as best seen in Figures 1 and 2, in the respective top portions of which flanges, are disposed a plurality of vents 9 opening at an end exteriorly of the structure and opening at their other end into the top of the structure, for a purpose shortly appearing, as best seen in Figure 4.

Each flange 8 is provided with a lip-portion 10 formed with spaced slots 11 and 12 for engaging sheet metal wall-members 13 and 14, respectively, which are secured at the back of the structure to a flange 15 by a screw 16 and thereby rigidly held against the base-portion 2. The sheet metal wall-members 13, 14, extend upwardly, being held in parallel spaced position by the slots 11 and 12, respectively, following the contour of the flange 8, so as to form a double walled continuous closure member over the back, top, and upper portion of the front side of the structure, the interstitial space of which is filled with a suitable heat insulating material 17, as shown.

The wall-members 13 and 14 terminate at a point part way down the front side of the structure a substantial distance above the upper edge of the front part of the base-member 2, thereby providing a door-opening 18.

The inner wall-member 14 extends somewhat below the termination of the outer wall-member 13, as best seen in Figure 3, and is provided with an out-turned flange member 19 for co-operation with the door of the structure, as will be subsequently more particularly described.

The outer member 13 terminates, as previously stated, at a point above the flange 19, and rigidly mounted at the end of the member 13 is a heat-deflecting flange 20, while provided on the front face 21 of the base-member 2 adjacent the end-members 3, is a pair of downwardly extending slits 22.

Figures 5, 7:
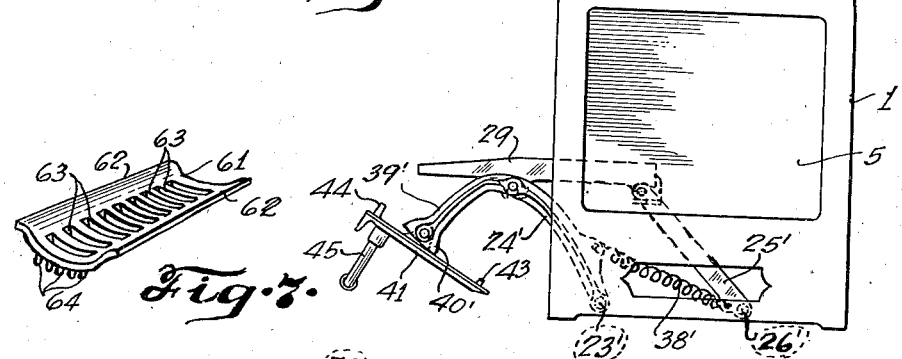
Figure 5 is a side elevational view of the structure.
Figure 7 is a perspective view of a novel type of radiant surface which forms a part of my present invention.

Swingably mounted at the lower part of the base 2 on a pivot 23, is a bent arm 24, a similarly shaped arm 24' being likewise swingably mounted on a pivot 23' at the opposite side of the base 2. Likewise a straight arm 25 is swingably mounted on a pivot 26 in the same horizontal line with, but rearwardly of, the pivot 23, and a similar and corresponding arm 25' is pivotally mounted, as at 26', on the opposite side of the base 2, as best seen in Figure 5.

Rigidly mounted on and extending horizontally between the bent arms 24 and 24', is a front supporting rod 27, and respectively lying substantially in the same plane as, and rearwardly of, the arm 27, and rigidly mounted on, and extending horizontally between the straight arms 25, 25', is a rear supporting rod 28.

Mounted removably on the two supporting rods 27, 28, is a cooking plate 29, which preferably is integrally provided at its opposite ends with a pair of downwardly extending bifurcated yoke members 30 for detachable engagement with the front supporting rod 27.

Integrally formed with the cooking plate 29 at the rear edge thereof, is a downwardly extending shoulder member 31, on the horizontal downwardly disposed face of which is a flat detent strip 32 for providing a forwardly extending hook assembly for holding the rear portion of the cooking plate 29 detachably on the rear supporting rod 28.

The cooking plate 29 is preferably marginally formed with an upstanding grease-retaining flange or lip 33, and the cooking surface 34 of plate 29 preferably slopes slightly downwardly to a drain outlet 35, whereby excess grease or other frying medium may flow off into a catch pan 35' disposed therebeneath, as best seen in Figure 2.

Pivotally attached at an end to the arm 25 at a point 36 thereon relatively near the pivot 26, and at its other end to the arm 24 at a point 37 spaced from the pivot 23 a substantially greater distance than the distance between the point 36 and the pivot 26 of the arm 25, is a tension spring 38, and similarly mounted and similarly positioned between the arms 24' and 25', is a tension spring 38', which is of the same dimensions and is of the same tensile strength as the spring 38, the combined strength of these springs 38, 38', preferably being sufficient to counter-balance the combined weight of the door and cooking plate 29.

The arms 24 and 24' have upwardly and forwardly projecting extensions 39 and 39', respectively, which terminate in shoulder-portions 40 and 40', respectively, pivotally mounted between which latter for closure of the opening 18, is a door-member or other suitable plate-like closure 41 preferably having a plurality of heat-proof glass or other transparent windows 42 for affording a clear view of the cooking-plate 29 when the door 41 is closed. It will be noted that the door 41 is somewhat larger in area than, although substantially similar in shape to, the door-opening 18 and is provided upon its inner face with an inwardly extending flange 43, which snugly fits inside the door-opening 18, so that such opening 18 is thereby sealed when the door 41 is in closed position, the flange 43, along its top horizontal portion, being widened to form a seating flange 44, as best seen in Figures 1, 3, and 5, so positioned that, as the door 41 is approaching closed position, the flange 44 will ride on the flange 19. The door 41, as has been pointed out, is pivotally mounted on, but horizontally spaced from, the shoulders 40 and 40', so that the door 41 is freely pivotal or swingable thereon. Thus, as the seating flange 44 rides along the flange 19, the door 41 will pivot more or less on the shoulders 40 and 40' and be drawn into tight closure engagement with the margin of the door opening 18. I may add that the door 41 is provided also with suitable handle means 45 preferably of some heat-resisting material and of any conventional pattern or design.

Positioned in a plane substantially parallel to, and below the bottom of, the cooking plate 29, is a multiple flame gas burner 46 of conventional design, the flames from which are directed upwardly and are controlled by a conventional type of gas burner valve 47, which is preferably located at the rear of the structure, as best seen in Figure 3, and provided with a horizontal rod 48 extending forwardly through the front portion of the base 2 and terminating in a suitable handle-member 49.

Extending across the back of the structure and adapted for connection through a T 51 with any available source of fuel or illuminating gas, is a horizontally disposed supply line 50, connected to which, in turn, through a conventional gas burner control valve 52, is a vertical manifold 53, which extends upwardly and connects to a horizontal manifold 54. As best seen in Figure 3, the manifold 54 extends across the back of the structure at a point intermediate the plane of the cooking-plate 29 and the plane of the top wall 13 of the structure, and extending outwardly and forwardly in a horizontal plane from the manifold 54, is a plurality of horizontal suitably spaced burner pipes 55, as best seen in Figures 3 and 4.

Also disposed in the main gas conduit 50, is a pilot light valve 56 of conventional pattern and design, which is manually operated from a push button and rod assembly 57 extending through the front portion of the base 2. Connected to the pilot light valve 56, is a T 58, to one arm of which, in turn, is connected a lower pilot light member 59 and to the other arm of which is similarly connected an upper pilot light member 60, the lower and upper pilot light members 59, 60, serving to ignite the lower and upper burners 46, 55, respectively, when desired.

A plurality of fire-clay or other refractory radiants 61, as best seen in perspective in Figure 7, are disposed between, and extend the full length of, the burner-pipes 55 from the front to the rear thereof, each radiant 61 being longitudinally provided with marginal shoulder-flanges 62 for straddling adjacent pipes 55. Intermediate the shoulders 62, each radiant 61 extends arcuately downwardly and is provided with a plurality of longitudinally spaced through draft-passages 63. At its said arcuate intermediate portion and on its under or lower face, each radiant 61 is also provided with a plurality of downwardly extending nibs 64.

The burner pipes 55 are provided with a plurality of flame jets arranged in two longitudinally extending rows and positioned so that each burner pipe 55, when flame is issuing therefrom, will direct a plurality of jets of flame in two opposite directions, substantially tangentially to the arcuate curves of the respectively adjacent surfaces of the radiants 61, so that, when the burners 55 are operating, the nibs 64 will become incandescent.

It will be noted that, since, as has been above described, the upper gas burners 55 are spaced downwardly from the top wall-member 14 of the structure and the radiants 61 fill the spaces therebetween, a chamber 65 will thereby be provided in the upper portion of the structure, which communicates with the space over the cooking plate 29 only through the passages 63 in the radiants 61 and similarly communicates with the outside atmosphere only through the vents 9.

In operation, the gas burners may be turned on and ignited in the customary manner, the flames may be adjusted to any desired size, and the structure allowed to heat up for a few minutes. As soon as the requisite cooking temperature is reached, the door handle 45 may be grasped by the operator and pulled outwardly and downwardly. On such movement, the arms 24 and 24' swing pivotally on the pivots 23 and 23', respectively, and, since the rod 27 is rigidly mounted therebetween, the rod 27 will correspondingly move forwardly and downwardly, carrying with it the cooking plate 29. Since the plate 29 meanwhile is also mounted on the rear supporting rod 28, movement of the arms 24, 24', will be transmitted by the rod 28 to the straight arms 25 and 25', which will, in turn, pivot about the pivots 26 and 26', respectively, carrying the plate 29 downwardly and outwardly while maintaining the cooking surface 34 thereof substantially in a horizontal plane. As the door 41 is moved into final downward position, the bent arms 24, 24', will project into the slots 22 and thereby allow a greater amount of forward movement of the cooking plate 29 in order to dispose the plate 29 more completely out and in front of the door opening 18, as best seen in Figure 1, in which position the plate 29 is readily accessible to the operator.

During the rocking movement of the arms 24, 24', 25, and 25', the lateral distance between the points 36 and 37 and 36' and 37', respectively, will increase, as best seen in Figure 5, thereby subjecting the springs 38, 38', to tension, which will counterbalance the weight of the cooking plate 29 and the door 41, so that both may be moved outwardly and inwardly with minimum effort.

The food to be cooked being now placed on the heated cooking plate 29, the door 41 may be then again closed, thereby causing the arms 24, 24', 25, 25', to pivot backwardly in the reverse direction to that above described, restoring the cooking plate 29 to its original position within the chamber of the structure. The particular food will then be cooked quickly and uniformly on both sides and at an even temperature. Meanwhile, the heat from the upper burner members 55 will cause the bottom sheet metal chamber 14 and the free space 65 above the upper burners 55 to become superheated. The smoke and gaseous products of cooking will pass upwardly against the incandescent nibs 64 and into the flames from the upper burners 55 and be substantially reduced to harmless carbon-dioxide, which, with the hot air from the cooking zone, will then pass upwardly through the openings 63 in the radiants 61 into the superheated space 65, in which space the residual undesirable gaseous products of cooking will be finally and completely converted to harmless non-noxious form and pass thence out of the structure through the vents 9.

Figure 6:
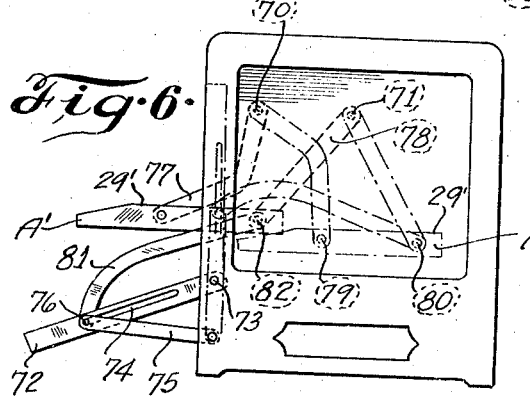
Figure 6 is a side elevational view of a modified form of structure embodying my invention, particularly showing a modified form of door and cooking plate operating means.

It is also possible, in accordance with my invention, to suspend the cooking plate from above, as shown and illustrated in Figure 6, in which case a pair of oppositely disposed pivot members 70 and 71 may be mounted, as shown, in the opposite vertical side walls of the structure. A door 72 is pivotally mounted, as at 73, and is provided with a slide 74, in which one end of an arm 75 is slidingly disposed on a pin 76. A pair of oppositely disposed bent arms 77 and a pair of oppositely disposed straight arms 78 are pivotally secured at one end, as at 79, 80, respectively, to the cooking-tray 29', and are pivotally secured at their other end to the pivot members 70 and 71, respectively. Likewise a pair of oppositely disposed connecting arms 81 are pivotally attached at one end, as at 80, to the tray 29', and at their other end to the pin 76. Thus, when the door 72 is open, the arms 75 will rock about the point 73, and the pin 76 will move longitudinally in the slide 74. Meanwhile, the connecting arm 81 will be moved forwardly and downwardly with the pin 76 and move pivotally about the point 80, thereby shifting the cooking plate 29' forwardly and outwardly with corresponding rocking of the arms 77 and 78, respectively, from the position shown in dotted lines at A in Figure 6 to the position shown at A' in Figure 6. In this particular embodiment, the weight of the cooking tray 29 may be counter-balanced by the weight of the door 72, thus dispensing with the necessity for counter-balancing springs or the like.

The structure is exceedingly efficient in the performance of its intended functions, and it is to be understood that changes and modifications in the form, construction, arrangement, and combination of the several parts of the structure may be made and substituted for those herein shown and described without departure from the nature and principle of my invention.

Having thus described my invention, what I claim and desire to secure by Letters Patent is:—

1. In a culinary structure, a casing providing a cooking-chamber having an opening, four arms pivotally connected at their lower extremities to the casing interiorly thereof, tie-rods pivotally connected to the arms for connecting the arms in selected pairs, cross-rods connected at their respective extremities to, and extending transversely between, the pairs of arms, a flat cooking-plate removably mounted on said cross-rod, one of the arms in each of said pairs being positioned adjacent the opening in the casing and being provided with a forwardly presented extension arm adapted for movement outwardly through the casing opening, and closure-forming means adapted for registration with the casing opening and being pivotally mounted on, and extending transversely between, the said forwardly extending arm-extensions.

2. A culinary structure comprising, a casing providing a cooking-chamber, a cooking-plate disposed therein, two pairs of swingably mounted arms disposed within the casing each pair comprising a forward and rearward arm, said rearward arm being disposed in alignment with said forward arm, and spring means diagonally disposed between said forward and rearward arm, said pair of arms being respectively disposed on opposite sides of the casing and being cooperatively arranged for supporting the cooking-plate at their upper extremities.

3. A culinary structure comprising, a casing providing a cooking-chamber, a cooking-plate disposed therein, two pairs of swingably mounted arms disposed within the casing each pair comprising a forward and rearward arm, said rearward arm being disposed in alignment with said forward arm, and spring means diagonally disposed between said forward and rearward arms, said pair of arms being respectively disposed on opposite sides of the casing, the rearward and forward arms of each of said pairs being respectively in lateral alignment and being cooperatively arranged for supporting the cooking-plate at their upper extremities.

4. A culinary structure comprising, a casing providing a cooking-chamber, a cooking-plate disposed therein, two pairs of arms pivotally mounted at their lower extremities within the casing each pair comprising a forward and a rearward arm, and spring means pivotally fixed at its one end to said rearward arm at a point slightly above the lower pivoted extremity thereof, said spring means extending diagonally upwardly and across to the forward arm and being at its other extremity pivotally attached to said forward arm, said pairs of arms being respectively disposed on opposite sides of the casing and being cooperatively arranged for supporting the cooking plate at their upper extremities.

5. A culinary structure comprising, a casing providing a cooking-chamber having a door-opening, a cooking-plate disposed therein, two pairs of swingably mounted arms disposed within the casing each pair comprising a forward and rearward arm, spring means diagonally disposed between said forward and rearward arms, said pairs of arms being respectively disposed on opposite sides of the casing and being cooperatively arranged for supporting the cooking-plate at their upper extremities, each of said forward arms further having an upper forwardly extending portion adapted for projection outwardly through the door opening upon swinging movement of the arm, and a door member pivotally mounted to said forwardly extending portions and being adapted to fit in closurewise relationship over said door opening.

JULIAN R. BURCH.